(12) United States Patent
Lutz et al.

(10) Patent No.: US 8,278,398 B2
(45) Date of Patent: Oct. 2, 2012

(54) TWO PART CRASH DURABLE EPOXY ADHESIVES

(75) Inventors: Andreas Lutz, Galganen (CH); Beda Steiner, Schaenis (CH)

(73) Assignee: Dow Global Technologies LLC, Midland, MI (US)

( * ) Notice: Subject to any disclaimer, the term of this patent is extended or adjusted under 35 U.S.C. 154(b) by 226 days.

(21) Appl. No.: 12/190,137

(22) Filed: Aug. 12, 2008

(65) Prior Publication Data
US 2009/0048370 A1 Feb. 19, 2009

Related U.S. Application Data

(60) Provisional application No. 60/965,499, filed on Aug. 17, 2007.

(51) Int. Cl.
C08L 71/00 (2006.01)
C08L 63/00 (2006.01)
C08L 77/00 (2006.01)

(52) U.S. Cl. ........ 525/430; 523/428; 525/423; 525/438; 525/449

(58) Field of Classification Search .................... 525/423
See application file for complete search history.

(56) References Cited

U.S. PATENT DOCUMENTS

| | | | |
|---|---|---|---|
| 4,704,331 A * | 11/1987 | Robins et al. | 428/414 |
| 4,931,482 A | 6/1990 | Lamberts | |
| 5,202,390 A | 4/1993 | Mulhaupt | |
| 5,278,257 A * | 1/1994 | Mulhaupt et al. | 525/454 |
| 5,290,857 A | 3/1994 | Ashida | |
| 5,686,509 A | 11/1997 | Nakayama | |
| 6,645,341 B1 * | 11/2003 | Gordon | 156/330 |
| 6,776,869 B1 | 8/2004 | Shenkel | |
| 6,800,157 B2 | 10/2004 | Tarbutton | |
| 6,884,854 B2 | 4/2005 | Shoenfeld | |
| 7,071,263 B2 | 7/2006 | Cheng | |
| 2004/0181013 A1 | 9/2004 | Schenkel | |
| 2005/0022929 A1 | 2/2005 | Schoenfeld | |
| 2005/0070634 A1 | 3/2005 | Lutz | |
| 2005/0143496 A1 | 6/2005 | Mueller | |
| 2005/0209401 A1 | 9/2005 | Lutz | |
| 2005/0215730 A1 | 9/2005 | Schoenfeld | |
| 2006/0205897 A1 | 9/2006 | Frick | |
| 2006/0276601 A1 | 12/2006 | Lutz | |
| 2007/0066721 A1 | 3/2007 | Kramer | |

FOREIGN PATENT DOCUMENTS

| | | | |
|---|---|---|---|
| EP | 1314748 A2 * | 5/2003 | |
| EP | 1632533 | 3/2006 | |
| WO | WO 2005-007720 | 1/2005 | |
| WO | WO 2005-118734 | 12/2005 | |

OTHER PUBLICATIONS

Hunstman, The JEFFAMINE Polyetheramines, 2007, p. 1.*
Huntsman, The JEFFAMINE Polyetheramines, 2007, The Huntsman Corporation.*
U.S. Appl. No. 12/099,856, filed Apr. 9, 2008, Lutz.

* cited by examiner

Primary Examiner — Peter F Godenschwager
Assistant Examiner — David Karst

(57) ABSTRACT

Two-component epoxy-based structural adhesives are disclosed which exhibit excellent impact resistance, even when cured at approximately room temperature. The adhesives include an epoxy resin component which includes an epoxy resin and a reactive tougher. The adhesives also include a hardener component, which includes from 15 to 50 weight percent of an amine-terminated polyether, from 4 to 40 weight percent of an amine terminated rubber having a glass transition temperature of −40° C. or below, and from 10 to 30 weight percent of an amine-terminated polyamide having a melting temperature of no greater than 50° C.

17 Claims, No Drawings

TWO PART CRASH DURABLE EPOXY ADHESIVES

This application claims priority from U.S. Provisional Application No. 60/965,499, filed 17 Aug. 2007.

This invention relates to a toughened two-part epoxy resin based adhesive.

Epoxy resin based adhesives are used to bond a variety of different substrates together. For example, epoxy resin adhesives are used in the automotive industry for metal-metal bonding in frame and other structures. Adhesive bonding can reduce the number of welds that are needed to construct the frame, and for that reason the use of these adhesives can reduce assembly costs.

Epoxy-based adhesives used in automotive and other vehicular applications typically contain a rubber modifier and a reactive "toughener". The rubber and toughener are needed in the adhesives to obtain useful elongations, to reduce brittleness, and to impart good low temperature performance. Structural adhesives of these types are described in, for example, U.S. Pat. No. 5,278,257, WO 2005/118734, U.S. Published Patent Application No. 2005/0070634, U.S. Published Patent Application No. 2005/0209401, U.S. Published Patent Application 2006/0276601 and EP-A-0 308 664. The epoxy-based adhesives used in these vehicular applications are sometimes referred to as "crash durable adhesives", or "CDAs", as they are formulated to minimize adhesive failure upon impacts as are experienced in crash situations.

In a factory setting, the epoxy-based adhesive is almost always thermally cured by exposing it to a temperature of above 60° C., sometimes as high as 170° C. Either a two-part or a one-part adhesive can be used in this situation, although one-part types are favored. The thermal curing not only reduces the time needed to complete the cure, but is also believed to be necessary for the full development of the physical and adhesive properties of the cured adhesive. In particular, the applied heat has been thought necessary to develop good impact resistance, as well as good low temperature performance. This is due in part to the reaction of the reactive "toughener" with the epoxy, which has been understood to take place at the elevated curing temperatures that are used. At high temperatures, blocked reactive groups on the toughener become deblocked and at that point become available or reaction with the epoxy.

On the other hand, repair situations often do not allow the adhesive to be thermally cured. This can be due to various factors, Many repair shops lack the heating equipment that is needed to provide an elevated cure. Also, in the repair shop setting, the adhesive is generally applied to a fully assembled vehicle, whereas in the production setting, the adhesive is often applied before the vehicle is fully assembled. In a fully-assembled vehicle, nearby components that are heat-sensitive or contain flammable materials may be present, and in such cases heat cannot be applied to cure the adhesive. Therefore, the adhesives used in repair situations are typically cured under ambient temperature conditions. These temperatures may range from as low as 10° C. (in an unheated or poorly heated work space) to as high as 40° C. (in an uncooled or poorly cooled work space).

Because of the difficulties associated with applying a thermal cure in a repair shop environment, two-part adhesives are prevalent there. Adhesive formulations that cure at about room temperature (~23° C.) usually cannot be formulated into single-component products because the fully formulated adhesives are not storage-stable. By contrast, the high-temperature cure products used during original manufacture are in most cases easily formulated into one-component products. This is because those products include latent curing agents and/or latent catalysts, which prevent ambient temperature curing reactions from occurring, and in this way provide a storage-stable product.

The ambient-temperature cured adhesives usually have not matched the properties of the thermally cured types, and in particular tend to have markedly poorer impact resistance. It would be desirable to provide an epoxy-based structural adhesive which can be cured at lower temperatures to form a cured adhesive which has physical and adhesive properties, especially impact resistance, which more closely match those of thermally-cured one-part toughened structural adhesives.

This invention is a two-component epoxy adhesive including an epoxy resin component A and a hardener component B, wherein:

the epoxy resin component A comprises at least one epoxy resin and the hardener component B comprises B-1) from 15 to 50 weight percent of a primary or secondary amine-terminated polyether;

B-2) from 4 to 40 weight percent of a primary or secondary amine-terminated rubber having a glass transition temperature of −40° C. or below; and B-3) from 10 to 30 weight percent of a primary or secondary amine-terminated polyamide having a melting temperature of no greater than 50° C., either component A or component B, or both contains at least one elastomeric toughener having blocked or capped isocyanate groups, and the epoxy adhesive contains at least one epoxy curing catalyst.

This epoxy composition can be cured at relatively low temperature conditions to provide a cured adhesive that has excellent impact resistance, as determined by the impact peel test described below. It is therefore particularly useful as a structural adhesive in vehicular applications. The ability of the adhesive to cure at relatively low temperatures makes it suitable for vehicular repair applications, in which ambient temperature cures are often implemented.

The invention is also a method for assembling a first member to a second member, comprising forming a layer of the two-part epoxy composition of the invention between the first member and the second member and curing the two-part epoxy composition. In embodiments of particular interest, the two-part epoxy composition is cured at a temperature of 60° C. or less, especially 40° C. or less. The composition cures at these lower temperatures to form a cured adhesive having excellent impact properties. This is a surprising effect, because these lower curing temperatures are thought to be insufficient to promote a significant amount of a curing reaction between the epoxy resin and the elastomeric toughener.

The epoxy resin composition of the invention includes an epoxy resin component A and a hardener component B. The epoxy resin component A includes at least one epoxy resin. Either or both of the components contains at least one elastomeric toughener.

A wide range of epoxy resins can be used in component A, including those described at column 2 line 66 to column 4 line 24 of U.S. Pat. No. 4,734,332, incorporated herein by reference. Suitable epoxy resins include the diglycidyl ethers of polyhydric phenol compounds such as resorcinol, catechol, hydroquinone, biphenol, bisphenol A, bisphenol AP (1,1-bis (4-hydroxyphenyl)-1-phenyl ethane), bisphenol F, bisphenol K, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novolac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure I:

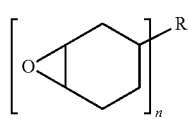

(I)

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins. The epoxy resin may be or include a mixture of a diglycidyl ether of at least one polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the two types of resins in such a case may be such that the mixture of the two resins has an average epoxy equivalent weight of from 225 to 400. A mixture of this type optionally may also contain up to 20%, preferably up to 10%, of one or more other epoxy resins.

The epoxy resin(s) suitably constitute at least 40, more preferably at least 50, percent of the weight of the resin component A. The epoxy resin(s) may constitute up to 85 weight percent of the resin component A, more preferably up to about 75 weight percent thereof.

The elastomeric toughener is a liquid or low-melting elastomeric material that contains capped or blocked isocyanate groups. The elastomeric portion of the elastomeric toughener includes one or more soft segments such as a polyether, a polybutadiene, or a polyester. Particularly preferred soft segments include poly(ethylene oxide) blocks, poly(propylene oxide) blocks, poly(ethylene oxide-co-propylene oxide) blocks, poly(butylene oxide) blocks, poly(tetrahydrofuran) blocks, poly(caprolactone) blocks and the like. These soft segments typically have a molecular weight of from 1000 to 10,000 daltons each, preferably from about 1500 to 5000 daltons. An especially preferred type of soft segment is a poly(tetrahydrofuran) block having a weight of from 2200 to 4500 daltons.

The elastomeric toughener contains at least one blocked or capped isocyanate group per molecule. It preferably contains an average of at least 2 such groups per molecule, but typically no more than 6 and preferably no more than about 4 blocked or capped isocyanate groups per molecule. Examples of capping or blocking groups are phenols or phenolamines, primary aliphatic, cycloaliphatic, heteroaromatic and araliphatic amines; secondary aliphatic, cycloaliphatic, aromatic, heteroaromatic and araliphatic amines, monothiols, alkylamides and hydroxyl functional epoxides, and benzyl alcohols. The capping or blocking group may contain functional groups such as phenol, aromatic amino, —OCN, epoxide, or it may comprise further polyurethane elastomers bound to it, but the capping or blocking group may instead be devoid of such groups. Preferred capping groups include a secondary aliphatic amine, a hydroxyalkylepoxide, or a phenol, aminophenol, polyphenol, allylphenol, or polyallylpolyphenol such as o,o-diallyl bisphenol A.

A convenient way to produce the elastomeric toughener is by forming an isocyanate-terminated prepolymer, and then reacting the remaining isocyanate groups with the capping or blocking agent. The isocyanate-terminated prepolymer is prepared by reacting a polyether polyol or polyester polyol, which corresponds to the structure of the soft segment of the reactive tougher, with an excess of a polyisocyanate. The polyisocyanate preferably contains aliphatic isocyanate groups. Preferred polyisocyanates are hexamethylene diisocyanate and isophorone diisocyanate.

The elastomeric toughener should be soluble or dispersible in the remainder of the components of the epoxy resin component A. The elastomeric toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the weight average molecular weight of the toughener is about 80,000 or less, and more preferably about 40,000 or less. Molecular weights as used herein are determined according to GPC analysis.

General methods for preparing these elastomeric tougheners are described, for example, in U.S. Pat. No. 5,278,257, WO 2005/118734, U.S. Published Patent Application No. 2005/0070634, U.S. Published Patent Application No. 2005/0209401, U.S. Published Patent Application 2006/0276601, EP 1 602 702A and EP-A-0 308 664.

The elastomeric toughener may be linear, branched or lightly crosslinked.

The elastomeric toughener is present in sufficient amount to improve the performance of adhesive compositions containing it under dynamic load. The elastomeric toughener suitably constitutes at least about 10 weight percent, preferably at least about 14 weight percent and more preferably at least about 18 weight percent of the resin component A. Preferably, the elastomeric toughener constitutes up to about 38 weight percent of the structural adhesive, more preferably up to about 28 weight percent and even more preferably up to about 25 weight percent of the epoxy resin component A.

The hardener composition comprises at least the following three components, in the following amounts:

B-1) from 15 to 50 weight percent of a primary or secondary amine-terminated polyether.

B-2) from 4 to 40 weight percent of a primary or secondary amine-terminated rubber having a glass transition temperature of −40° C. or below; and B-3) from 10 to 30 weight percent of a primary or secondary amine-terminated polyamide having a melting temperature of no greater than 50° C.

The amine-terminated polyether contains a polyether backbone and has at least two, preferably from 2 to 4, primary or secondary amine groups per molecule. The amine groups are preferably primary amine groups. The polyether backbone may be, for example, a homopolymer of ethylene oxide, propylene oxide, 1,2-butylene oxide, styrene oxide, tetrahydrofuran and the like, or may be a copolymer of any two or more of these. Preferred polyether backbones are poly(propylene oxide), block or random copolymers of ethylene oxide and propylene oxide, and poly(tetrahydrofuran). The molecular weight of the amine-terminated polyether may be from about 200 to about 5000. A preferred molecular weight is from about 230 to about 2200. Suitable amine-terminated polyethers include those sold by Huntsman Chemicals under the trade designations Jeffamine D-230, Jeffamine D-400, Jeffamine D-2000, Jeffamine D-4000, Jeffamine T-403, Jeffamine XTJ-542, Jeffamine XTJ-548 and Jeffamine XJ-559.

The amine-terminated rubber is a material having a glass transition temperature ($T_g$) of −40° C. or lower. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

The rubber preferably contains from about 1, more preferably from about 1.5, even more preferably from about 1, to about 2.5, more preferably to about 2.2, primary or secondary amino groups per molecule, on average. Primary amino groups are preferred. The molecular weight ($M_n$) of the rubber is suitably from about 2000 to about 6000, more preferably from about 3000 to about 5000.

The amine-terminated polyamide material contains has a melting temperature of no greater than 50° C. Preferably the polyamide has a melting temperature of no greater than 35° C. Even more preferably, the polyamide is a liquid at 22° C. The polyamide contains an average of at least 1.5, more preferably at least 1.8 and even more preferably at least 2.0 primary or secondary amine groups per molecule. The polyamide may have 6 or more primary or secondary amine groups per molecule, and typically will contain from 2 to 3 primary or secondary amine groups per molecule.

A polyamide of particular interest is the reaction product of a dimerized fatty acid and a polyamine. Examples of such polyamides include those available from Cognis under the trade designations Versamid® 115, Versamid® 125 and Versamid® 140.

The hardener component B preferably contains from 10 to 40 weight percent of the amine-terminated polyether, and from 5 to 40 weight percent of the epoxide-reactive rubber having a glass transition temperature of −40° C. or below; and from 10 to 25 weight percent of the amine-terminated polyamide. The hardener component B even more preferably contains from 15 to 35 weight percent of the amine-terminated polyether, from 5 to 35 weight percent of the epoxide-reactive rubber having a glass transition temperature of −40° C. or below; and from 10 to 20 weight percent of the amine-terminated polyamide. In the preferred and more preferred embodiments, the weight ratio of the amine-terminated polyether to amine-terminated polyamide is from about 0.3 to 5, and preferably is from 0.6 to 3.5.

The epoxy adhesive may contain various optional components in addition to those described above. These are typically included in the epoxy resin component A, the hardener component B, or both. In general, accelerators and ingredients that contain epoxide-reactive groups will be blended into the hardener component B. Materials that contain epoxy groups or are reactive with the hardener(s) are generally formulated into the epoxy resin composition A. Unreactive materials may be formulated into either or both of the A and B components.

Examples of useful optional components include, for example, additional hardeners, curing catalysts, adhesion promoters, fillers, rheology modifiers, pigments, additional rubbers, diluents (which may be reactive), plasticizers, extenders, fire-retarding agents, thixotropic agents, flow control agents, thickeners such as thermoplastic polyesters, gelling agents such as polyvinylbutyral, fillers, dyes, antioxidants and the like.

The hardener composition B preferably includes at least one additional hardener or curing agent which contains at least two epoxide reactive groups per molecule. The additional hardener preferably contains primary or secondary amine groups and has an equivalent weight per primary or secondary amine group of not more than 150, more preferably not more than 125. Examples of such additional amine hardeners include, for example, 4,7,10-trioxytridecane-1,13-diamine, 4-7-dioxydecane-1,10-diamine, diethylene triamine, triethylene tetraamine, tetraethylene pentaamine, higher polyalkylene polyamines, and aminoethyl piperazine. The additional hardener may constitute up to 20 percent of the total weight of the hardener component B.

Polyethyleneimine polymers are particularly useful additional hardeners, which are conveniently blended into the B component.

Additional hardener(s), if used, can constitute from 0.5 weight percent or more of the hardener component B. Additional hardener(s) may constitute up to 30 weight percent of the hardener component B. Preferably, they can constitute up to 20 weight percent of the hardener component B. A preferred amount is from 5 to 20 weight percent. In the case that a polyethyleneimine polymer is used as an additional hardener, it is most preferably used in an amount of from 10 to 16 weight percent of the hardener component B.

The structural adhesive will in most cases contain a catalyst for the cure of the adhesive. This will most often be blended into the hardener component B, but can also be blended into the epoxy resin component A if adequate storage stability is maintained. Useful catalysts include p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazoles, such as 2-ethyl-2-methylimidazole, or N-butylimidazole, 6-caprolactam, and 2,4,6-tris(dimethylaminomethyl)phenol integrated into a poly(p-vinylphenol) matrix (as described in European patent EP 0 197 892) and aminoethyl piperazine. Tertiary amine catalysts are preferred.

Preferably, the catalyst is present in the adhesive composition in an amount of at least about 0.1 weight percent of the total weight of the structural adhesive composition (i.e., the combined weight of both A and B components), and most preferably at least about 0.2 weight percent. The catalyst is preferably blended into the hardener component B. The preferred tertiary amine catalysts preferably constitute from 3 to 15 weight percent of the hardener component B Adhesion promoters can be present in either the A or B components. Examples of suitable adhesion promoters include various types of silane compounds such as and epoxy silane and aminosilane compounds. Epoxy silanes are conveniently blended into the A component and aminosilanes are conveniently blended into the B component. Silane and epoxy silane adhesion promoters are typically used in amounts of from 0.5 to 5 weight percent of the A component.

A filler, rheology modifier and/or pigment is preferably present in the structural adhesive. These can perform several functions, such as (1) modifying the rheology of the adhesive in a desirable way, (2) reducing overall cost, (3) absorbing moisture or oils from the adhesive or from a substrate to which it is applied, and/or (4) promoting cohesive, rather than adhesive, failure. Examples of these materials include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Hollow microspheres or heat-expandable microspheres such as sold under the trade name Expancel can be used if heat can be applied during the curing step. Among these, calcium carbonate, talc, calcium oxide, fumed silica and wollastonite are preferred, either singly or in some combination, as these often promote the desired cohesive failure mode.

The filler may be in the form of nanoparticles that are dispersed in the epoxy resin.

Fillers, rheology modifiers, gelling agents, thickeners and pigments preferably are used in an aggregate amount of about 5 parts per hundred parts of adhesive composition or greater, more preferably about 10 parts per hundred parts of adhesive composition or greater. They preferably are present in an amount of up to about 25 weight percent of the structural adhesive, more preferably up to about 20 weight percent, and most preferably up to about 15 weight percent. These materials are preferably blended into the resin component A, but in some cases may be blended into the hardener component B. It is also possible in some cases to blend these materials into both component A and component B, or to blend some of them into component A and others into component B.

Fatty acids and oligomers of fatty acids, such as fatty acid dimers, are also useful epoxy additives, and are usually epoxy-terminated.

The adhesive may contain a toughening rubber in addition to the amine-terminated rubber described before. The additional toughening rubber is preferably present in the form of a rubber-modified epoxy resin, in the form of core-shell particles, or some combination of both. The toughening rubber should have a glass transition temperature ($T_g$) of no greater than $-25°$ C. Preferably, at least a portion of the toughening rubber has a $T_g$ of $-40°$ C. or lower, more preferably $-50°$ C. or lower and even more preferably $-70°$ C. or lower. The $T_g$ of the toughening rubber may be as low as $-100°$ C. or even lower.

A rubber-modified epoxy resin is an epoxy-terminated adduct of an epoxy resin and at least one liquid rubber that has epoxide-reactive groups, such as amino or preferably carboxyl groups. If used, it should be blended into resin component A. The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct, without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the amine-terminated or carboxyl-terminated rubber and an excess of the epoxy resin are mixed together with a polymerization catalyst and heated to a temperature of about 100 to about 250° C. in order to form the adduct. Useful catalysts for conducting the reaction between the rubber and the epoxy resin include those described before. Preferred catalysts for forming the rubber-modified epoxy resin include phenyl dimethyl urea and triphenyl phosphine.

A wide variety of epoxy resins can be used to make the rubber-modified epoxy resin, including any of those described before. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

Another suitable type of toughening rubber is a core-shell rubber, which is preferably blended into the resin component A. The core-shell rubber is a particulate material having a rubbery core. The rubbery core preferably has a $T_g$ of less than $-25°$ C., more preferably less than $-50°$ C. and even more preferably less than $-70°$ C. The $T_g$ of the rubbery core may be well below $-100°$ C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below $-100°$ C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. If dispersions such as this are used, the epoxy resin contained in those products will form all or part of the epoxy resin component of the structural adhesive of the invention.

The additional toughening rubber can be incorporated into either the A or B component of the adhesive. If the rubber is epoxy-terminated, it should be incorporated into the A component. If it is terminated with epoxide-reactive groups, it should be incorporated into the B component. If the rubber contains neither epoxide groups nor epoxide-reactive groups, as is the case in a core-shell rubber, it may be incorporated into either the A or B component.

The additional toughening rubber, if present at all, may constitute up to 40 weight percent of the combined weight of components A and B. A preferred amount is from 1 to 7 weight percent, and a more preferred amount is from 1 to 5 weight percent, except in the case of a core-shell rubber, which is preferably present in an amount of up to 10%.

The adhesive of the invention can be used to bond a variety of substrates together, including wood, metal, coated metal, aluminum, a variety of plastic and filled plastic substrates, fiberglass and the like. In one preferred embodiment, the adhesive is used to bond parts of automobiles together. Such parts can be steel, coated steel, galvanized steel, aluminum, coated aluminum, plastic and filled plastic substrates.

An application of particular interest is bonding of vehicular (land vehicles, watercraft or aerospace vehicles) frame components to each other or to other components. The frame components are often metals such as cold rolled steel, galvanized metals, or aluminum. The components that are to be bonded to the frame components can also be metals as just described, or can be other metals, plastics, composite materials, and the like.

The adhesive is used by forming a film of the adhesive between two members or substrates that are to be adhered together. The resin component A and the hardener component B can be mixed together before or after applying them to the member or members. The resin component A and the hardener component B are suitably mixed in proportions such that at least 0.5, preferably at least 0.8 and more preferably 0.9 to 1 mole of epoxide reactive groups are provided by hardener component B per mole of epoxide groups provided by resin component A.

The manner in which the adhesive is applied is not especially important, and any convenient technique for doing so can be used. It can be applied cold or be applied warm if desired. It can be applied by extruding it from a robot into bead form on the substrate, it can be applied using mechanical application methods such as a caulking gun, or any other manual application means. The swirl technique is applied using an apparatus well known to one skilled in the art such as pumps, control systems, dosing gun assemblies, remote dosing devices and application guns. The adhesive may be applied to one or both of the members or substrates. The substrates are contacted such that the adhesive is located between the substrates to be bonded together.

After application, the substrates or members are brought together to form a sandwich structure with a layer of the adhesive composition in the center. If desired, the adhesive may heated to an elevated temperature to promote the cure. Elevated curing temperatures may range from, for example 60° C. or higher, 80° or higher or 100° C. or higher, and may be as much as 220° C., more preferably no higher than 180° C. However, an important advantage of this invention is that the adhesive composition can be cured at relatively low temperatures with development of useful properties such as impact resistance. Therefore, the invention may be cured at a temperature of 60° C. or less with useful results. Curing temperatures may be as low as 0° C., or as low as 10° C. A preferred curing temperature is from 10 to 40° C., and especially from 15 to 35° C. In an especially preferred embodiment, the curing temperature is from 15 to 30° C.

Impact peel resistance is a particularly important property of the cured adhesive. Impact peel resistance is conveniently measured according to ISO 11343 wedge impact method, with testing being performed at an operating speed of 2 m/sec on a 0.75 mm cold rolled steel 1403 substrate with a bonded area of 30×20 mm and an adhesive layer of 0.2 mm. Under these conditions, the cured adhesive preferably exhibits an impact peel strength of at least 20 N/mm when measured at 23° C. The impact peel strength under these conditions is preferably at least 22 N/mm and even more preferably at least 24 N/mm. These impact peels strengths are often seen even when the adhesive is cured at 60° C. or less or from 10 to 40° C., and in particular when cured at about room temperature (~23° C.).

The adhesive composition once cured preferably has a Young's modulus of about 1000 MPa as measured according to DIN EN ISO 527-1. More preferably, the Young's modulus is about 1200 MPa or greater. Preferably, the cured adhesive demonstrates a tensile strength of about 25 MPa or greater, more preferably about 30 MPa or greater, and most preferably about 35 MPa or greater. Preferably, the lap shear strength of a 0.75 mm thick cured adhesive layer is about 15 MPa or greater, more preferably about 20 MPa or greater, and most preferably about 25 MPa or greater measured according to DIN EN 1465.

EXAMPLES

The following examples are provided to illustrate the invention but are not intended to limit the scope thereof. All parts and percentages are by weight unless otherwise indicated.

Three formulated epoxy resin components (A1, A2 and A3) are prepared by blending ingredients as indicated in Table 1.

TABLE 1

| | Parts by Weight | | |
|---|---|---|---|
| Ingredient | A1 | A2 | A3 |
| Epoxy Resin A[1] | 67 | 58 | 74 |
| Toughener A[2] | 0 | 27 | 14 |
| Toughener B[3] | 21 | 0 | 0 |
| Epoxy silane[4] | 3 | 2 | 2 |
| Alkylated Phenol Wetting Agent[5] | 0.5 | 3 | 3 |
| Talc | 3.6 | 3.6 | 3.6 |
| Fumed Silica | 4.5 | 3 | 3 |

[1] Epoxy Resin A is a liquid diglycidyl ether of bisphenol A having an epoxy equivalent weight of approximately 186. It is available from The Dow Chemical Company as DER™ 330.
[2] Toughener A is an isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664. Toughener A has an $M_n$ of 6,900 and an $M_w$ of 13,200.
[3] Toughener B is made according to processes described in US 2005/0070634 A1.
[4] Dynasilan A187, available from Evonik Industries AG.
[5] NC700, from Cardolite.

Example 1

Hardener composition B1 is prepared by blending the ingredients indicated in Table 2.

TABLE 2

| Ingredient | Parts by Weight |
|---|---|
| Amine-terminated polyether A[1] | 22.3 |
| Amine-terminated rubber[2] | 17 |
| Amine-functional polyamide A[3] | 14 |
| Poly(ethyleneimine)[4] | 14 |
| Catalyst[5] | 5 |
| 4,7,10-trioxatridecane-1,13-diamine | 10 |

[1] A difunctional, primary amine-terminated poly(propylene oxide) having a molecular weight of about 400. It is commercially available from Huntsman Chemicals as Jeffamine™ D400.
[2] An amine-terminated butadiene/nitrile rubber commercially available from Noveon as Hycar™ 1300X16.
[3] A polyamide which is a liquid reaction product of a polyamine with a dimerized fatty acid. It is commercially available from Cognis as Versamid™ 140.
[4] Lupasol P, from BASF.
[5] A commercially available 2,4,6-tris(dimethylaminomethyl)phenol.

Adhesive Example 1 is prepared by stirring a portion of epoxy resin component A1 and a portion of hardener component B1 together at a volume ratio of 2:1. Adhesive Example 1 is then applied to duplicate test specimens for impact peel testing on various substrates and at various testing temperatures. Impact peel testing is performed in accordance with ISO 11343 wedge impact method. Testing is performed at an operating speed of 2 m/sec. The substrates are (1) 0.75-mm cold rolled steel 1403, (2) 1.2-mm aluminum (AA 6016) surface pretreated with Alodine 2040, (3) 0.9-mm hot dipped zinc coated steel (H-340-LAD+2) and (4) 0.9-mm electrogalvanized steel (DC04-B+ZE). Impact peel testing is performed at 23° C. for all substrates, and additionally at 0° C. and −20° C. for the bonded cold rolled steel.

Test coupons for the impact peel testing are 90 mm×20 mm with a bonded area of 30×20 mm. The samples are prepared by wiping them with acetone. A 0.15 mm×10 mm wide Teflon tape is applied to the coupons to define the bond area. The structural adhesive is then applied to the bond area of latter coupon and squeezed onto the first coupon to prepare each test specimen. The adhesive layer is 0.2 mm thick. Duplicate samples are cured at 60° C. for 2 hours, 23° C. for 2 days, or 23° C. for 7 days. Results of the impact peel testing are as indicated in Table 3.

Duplicate test coupons are prepared and are evaluated for lap shear strength in accordance with DIN EN 1465. Testing is performed at a test speed of 10 mm/minute. The substrates are the same as used in the impact peel testing. Testing is performed at 23° C., with lap shear strength being measured.

Test samples are prepared using each adhesive. The bonded area in each case 25×10 mm. The adhesive layer is 0.2 mm thick. Duplicate test specimens are cured at 60° C. for 2 hours or 23° C. for 7 days prior to testing. Results are as indicated in Table 3.

For comparison, a commercially available two-part epoxy structure adhesive that is marketed into automotive repair applications (Comparative Sample A) is evaluated for impact peel and lap shear strength in the same manner as described. Results are as indicated in Table 3.

TABLE 3

| | Results | |
|---|---|---|
| Test Method | Example 1 | Comparative Sample A* |
| Impact Peel Strength, N/mm, 23° C. | | |
| CRS[1]/Cured at 60° C. for 2 hours | 23 | 15 |
| CRS/Cured at 23° C. for 2 days | 26 | 13 |
| CRS/Cured at 23° C. for 7 days | 24 | 18 |
| Al[2]/Cured at 23° C. for 7 days | 20 | 12 |
| HDS[3]/Cured at 23° C. for 7 days | 18 | 7 |
| EGS[4]/Cured at 23° C. for 7 days | 21 | 13 |
| Impact Peel Strength, N/mm, 0° C. | 18 | 4 |
| Impact Peel Strength, N/mm, −20° C. | 13 | <1 |
| Lap Shear Strength, MPa, 23° C. | | |
| CRS/Cured at 60° C. for 2 hours | 14.4 | 17.3 |
| CRS/Cured at 23° C. for 2 days | 14.2 | 15.9 |
| CRS/Cured at 23° C. for 7 days | 17.1 | 15.8 |
| Al/Cured at 23° C. for 7 days | 17.2 | 17.5 |
| HDS/Cured at 23° C. for 7 days | 20.0 | 19.0 |
| EGS/Cured at 23° C. for 7 days | 16.1 | 18.5 |

*Not an example of the invention.
[1] 0.75-mm cold rolled steel 14O3.
[2] 1.2-mm aluminum (AA 6016) surface pretreated with Alodine 2040.
[3] 0.9-mm hot dipped zinc coated steel (H-340-LAD + 2).
[4] 0.9-mm electrogalvanized steel (DC04-B + ZE).

Examples 2-9

Hardener components B2-B9 are made by mixing the ingredients indicated in Table 4.

TABLE 4

| | Parts by Weight | | | | | | | |
|---|---|---|---|---|---|---|---|---|
| Ingredient | B2 | B3 | B4 | B5 | B6 | B7 | B8 | B9 |
| Amine-terminated polyether A[1] | 22.3 | 22.3 | | | | 10 | 30 | 20 |
| Amine-terminated polyether B[2] | | | 22.3 | 28.3 | | | | |

TABLE 4-continued

| Ingredient | Parts by Weight | | | | | | | |
|---|---|---|---|---|---|---|---|---|
| | B2 | B3 | B4 | B5 | B6 | B7 | B8 | B9 |
| Amine-terminated polyether C[3] | | | | | 22.3 | | | |
| Amine-terminated rubber[4] | 17 | 17 | 17 | 15 | 17 | 20.5 | 14.8 | 15.3 |
| Amine-functional polyamide A[5] | | | 14 | 12 | 14 | 16.9 | 12.2 | 21 |
| Amine-functional polyamide B[5] | 14 | | | | | | | |
| Amine-functional polyamide C[5] | | 14 | | | | | | |
| Poly(ethyleneimine)[6] | 14 | 14 | 14 | 12 | 14 | 16.9 | 12.2 | 12.5 |
| Catalyst[7] | 5 | 5 | 5 | 5 | 5 | 6 | 4.4 | 4.5 |
| 4,7,10-trioxatridecane-1,13-diamine | 10 | 10 | 10 | 10 | 10 | 12 | 8.7 | 9 |

[1]A difunctional, primary amine-terminated poly(propylene oxide) having a molecular weight of about 400. It is commercially available from Huntsman Chemicals as Jeffamine ™ D400.
[2]A difunctional, primary amine-terminated poly(propylene oxide) having a molecular weight of about 2000, commercially available from Huntsman Chemicals as Jeffamine ™ D2000.
[3]A trifunctional, primary amine-terminated poly(propylene oxide) having a molecular weight of about 440, commercially available from Huntsman Chemicals as Jeffamine ™ T403.
[4]An amine-terminated butadiene/nitrile rubber commercially available from Noveon as Hycar ™ 1300X16.
[5]Amine-functional polyamides A, B and C are liquid reaction products of a polyamine with a dimerized fatty acid, commercially available from Cognis as Versamid ™ 140, 115 and 125, respectively.
[6]Lupasol P, from BASF.
[7]A commercially available 2,4,6-tris(dimethylaminomethyl)phenol.

Adhesive Examples 2-9 are prepared by stirring a portion of epoxy resin component A1 and a portion of hardener components B2-B9 together at a volume ratio of 2:1. Impact peel testing and lap shear testing are performed on cold rolled steel substrates, in the manner described in Example 1. Curing conditions and test results are as indicated in Table 5.

TABLE 5

| Test Method | Results | | | | | | | |
|---|---|---|---|---|---|---|---|---|
| | Ex. 2 | Ex. 3 | Ex. 4 | Ex. 5 | Ex. 6 | Ex. 7 | Ex. 8 | Ex. 9 |
| Impact Peel Strength, N/mm, 23° C. | | | | | | | | |
| 60° C. for 2 hours | 19 | 19 | 20 | 16 | 24 | 17 | 17 | 19 |
| 23° C. for 2 days | ND | ND | 22 | 23 | 23 | ND | ND | ND |
| 23° C. for 7 days | 21 | 24 | 22 | 24 | 24 | 21 | 25 | 22 |
| Lap Shear Strength, MPa, 23° C. | | | | | | | | |
| 60° C. for 2 hours | 14.7 | 16.0 | 11.8 | 10.3 | 16.3 | 16.5 | 14.3 | 16.0 |
| 23° C. for 2 days | ND | ND | 12.1 | 9.3 | 17.3 | ND | ND | ND |
| 23° C. for 7 days | 16.9 | 16.2 | 14.8 | 13.3 | 17.1 | 16.7 | 17.1 | 16.3 |

ND—not determined.

Examples 10-12

Hardener components B10-B12 are made by mixing the ingredients indicated in Table 6:

TABLE 6

| Ingredient | Parts By Weight | | |
|---|---|---|---|
| | B10 | B11 | B12 |
| Amine-terminated polyether A[1] | 24.8 | 20.2 | 17.3 |
| Amine-terminated rubber[2] | 10 | 24 | 32 |
| Amine-functional polyamide A[3] | 15.5 | 12.3 | 10.5 |
| Poly(ethyleneimine)[4] | 15.5 | 12.3 | 10.5 |
| Catalyst[5] | 5.5 | 4.5 | 4 |
| 4,7,10-trioxatridecane-1,13-diamine | 11 | 9 | 8 |

[1-5]See notes 1-5 of Table 1.

Adhesive Examples 10-12 are prepared by stirring a portion of epoxy resin component A1 and a portion of hardener components B10-B12 together at a volume ratio of 2:1. Impact peel testing and lap shear testing are performed on cold rolled steel substrates, in the manner described in Example 1. Curing conditions and test results are as indicated in Table 7.

TABLE 7

| Test Method | Results | | |
|---|---|---|---|
| | Ex. 10 | Ex. 11 | Ex. 12 |
| Impact Peel Strength, N/mm, 23° C. | | | |
| 60° C. for 2 hours | 20 | 19 | 19 |
| 23° C. for 7 days | 17 | 22 | 23 |
| Lay Shear Strength, MPa, 23° C. | | | |
| 60° C. for 2 hours | 14.2 | 16.0 | 13.4 |
| 23° C. for 7 days | 15.8 | 16.3 | 16.4 |

Examples 13 and 14

Adhesive Examples 13 and 14 are prepared by stirring a portion of epoxy resin components A2 and A3, respectively, and a portion of hardener component B1 together at a volume ratio of 2:1. Impact peel testing and lap shear testing are performed on cold rolled steel substrates, in the manner described in Example 1. Curing conditions and test results are as indicated in Table 8.

TABLE 8

| Test Method | Results | |
|---|---|---|
| | Ex. 13 | Ex. 14 |
| Impact Peel Strength, N/mm, 23° C. | | |
| 60° C. for 2 hours | 12 | 16 |
| 23° C. for 7 days | 15 | 17 |
| Lay Shear Strength, MPa, 23° C. | | |
| 60° C. for 2 hours | 12.1 | 15.4 |
| 23° C. for 2 days | 13.1 | ND |
| 23° C. for 7 days | 14.8 | 17.8 |

ND—not determined.

What is claimed is:

1. A two-component epoxy adhesive including an epoxy resin component A and a hardener component B, wherein:
   the epoxy resin component A comprises at least one epoxy resin and the hardener component B comprises
   B-1) from 15 to 35 weight percent of a primary or secondary amine-terminated polyether;
   B-2) from 5 to 35 weight percent of a primary or secondary amine-terminated rubber having a glass transition temperature of −40° C. or below; and
   B-3) from 10 to 20 weight percent of a primary or secondary amine-terminated polyamide having a melting temperature of no greater than 50° C.,
either component A or component B, or both contains at least one elastomeric toughener having blocked or capped isocyanate groups, and the epoxy adhesive contains at least one epoxy curing catalyst.

2. The two-component epoxy adhesive of claim 1, wherein the hardener component B includes from 3 to 15 wt. % of a tertiary amine catalyst.

3. The two-component epoxy adhesive of claim 2, wherein the hardener component B further comprises from 5 to 15 weight percent of at least one additional hardener having at least two primary or secondary amino groups per molecule and an equivalent weight per primary or secondary amino group of not more than 150.

4. The two-component epoxy adhesive of claim 3, wherein the additional hardener includes a poly(ethyleneimine).

5. The two-component epoxy adhesive of claim 4, wherein the amine-terminated polyether is a poly(propylene oxide), a block or random copolymer of ethylene oxide and propylene oxide, or a poly(tetrahydrofuran) having a molecular weight of from 200 to 5000 and having from 2 to 4 primary or secondary amino groups per molecule.

6. The two-component adhesive of claim 1, wherein the amine-terminated polyether is a poly(propylene oxide) having a molecular weight of from 230 to 2200 and from 2 to 3 primary amino groups/molecule.

7. The two-component adhesive of claim 1, wherein the elastomeric toughener contains one or more soft segments each having a molecular weight of from 1500 to 5000 daltons, and from 1 to 6 blocked or capped isocyanate groups per molecule.

8. The two-component adhesive of claim 7, wherein the elastomeric toughener contains isocyanate groups that are capped with one or more of a primary aliphatic, cycloaliphatic, heterocyclic or aralphatic amine, a secondary aliphatic, cycloaliphatic, heterocyclic or aralphatic amine, a phenol, aminophenol, allylphenol or polyallylpolyphenol.

9. The two-component adhesive of claim 7, wherein the elastomeric toughener contains one or more poly(tetrahydrofuran) soft segments each having a molecular weight of from 2200 to 4500 daltons.

10. The two-component adhesive of claim 1, wherein the amine-terminated polyamide is a reaction product of a dimerized fatty acid and a polyamine.

11. The two-component adhesive of claim 1, which further contains at least one core-shell rubber.

12. The two-component adhesive of claim 1, wherein at least one of the epoxy resin component A and the hardener component B further contains at least one adhesion promoter, wetting agent, reactive diluent, filler, pigment or rheology modifier.

13. The two-component adhesive of claim 1, wherein at least one of the epoxy resin component A and the hardener component B further contains an adduct of an epoxy resin and rubber that has epoxide-functional groups.

14. A method for assembling a first member to a second member, comprising forming a layer of the two-part epoxy composition of claim 1 between the first member and the second member and curing the two-part epoxy composition.

15. The method of claim 14 wherein the epoxy composition is cured at a temperature of 60° C. or less.

16. The method of claim 15 wherein the epoxy composition is cured at a temperature of from 10° C. to 40° C.

17. The two-component epoxy adhesive of claim 1 which cures at a temperature of 23° C. to form a cured adhesive having an impact peel resistance of at least 20 N/mm when measured at 23° C. according to ISO11343 wedge impact method, with testing being performed at an operating speed of 2 m/sec on a 0.75 mm cold rolled steel 14O3 substrate with a bonded area of 30×20 mm and an adhesive layer of 0.2 mm.

* * * * *